US008705486B2

(12) United States Patent
Patil et al.

(10) Patent No.: US 8,705,486 B2
(45) Date of Patent: Apr. 22, 2014

(54) METHODS AND APPARATUS FOR SCHEDULING PEER TO PEER TRAFFIC IN CELLULAR NETWORKS

(75) Inventors: Shailesh Patil, Bridgewater, NJ (US); Hua Wang, Bridgewater, NJ (US); Xinzhou Wu, Monmouth Junction, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 213 days.

(21) Appl. No.: 13/008,971

(22) Filed: Jan. 19, 2011

(65) Prior Publication Data

US 2012/0182962 A1    Jul. 19, 2012

(51) Int. Cl.
H04Q 3/08         (2006.01)
H04W 72/04       (2009.01)
H04W 72/02       (2009.01)

(52) U.S. Cl.
CPC .......... *H04W 72/0446* (2013.01); *H04W 72/04* (2013.01); *H04W 72/02* (2013.01)
USPC ....................................................... 370/330

(58) Field of Classification Search
None
See application file for complete search history.

(56) References Cited

U.S. PATENT DOCUMENTS

| 6,122,673 | A   | * | 9/2000  | Basak et al. .................. 709/238 |
| 6,331,973 | B1  |   | 12/2001 | Young et al. |
| 7,486,638 | B2  | * | 2/2009  | Ofuji et al. .................... 370/329 |
| 2005/0009578 | A1 | * | 1/2005  | Liu .............................. 455/574 |
| 2005/0078672 | A1 | * | 4/2005  | Caliskan et al. ............... 370/389 |
| 2005/0226214 | A1 | * | 10/2005 | Keslassy et al. .............. 370/351 |
| 2005/0270975 | A1 |   | 12/2005 | Meylan et al. |
| 2009/0016229 | A1 |   | 1/2009  | Wu et al. |
| 2009/0017762 | A1 | * | 1/2009  | Jovicic et al. ................ 455/63.1 |
| 2009/0017838 | A1 |   | 1/2009  | Laroia et al. |
| 2009/0019113 | A1 | * | 1/2009  | Wu et al. ........................ 709/204 |
| 2009/0111506 | A1 |   | 4/2009  | Laroia et al. |
| 2009/0135720 | A1 |   | 5/2009  | Li et al. |
| 2009/0327395 | A1 |   | 12/2009 | Park et al. |

FOREIGN PATENT DOCUMENTS

| WO | WO-2005060182 A1 | 6/2005 |
| WO | WO2009009614     | 1/2009 |
| WO | WO2010049801 A1  | 5/2010 |
| WO | WO2010082084 A1  | 7/2010 |

OTHER PUBLICATIONS

International Search Report and Written Opinion—PCT/US2012/021601—ISA/EPO—Mar. 21, 2012.
Peng T, et al., "Interference avoidance mechanisms in the hybrid cellular and device-to-device systems", IEEE 20th International Symposium on Personal, Indoor and Mobile Radio Communications (PIMRC 2009), IEEE, Piscataway, NJ, USA, Sep. 13, 2009, pp. 617-621, XP031659660, ISBN: 978-1-4244-5122-7, p. 617-p. 619.

* cited by examiner

*Primary Examiner* — Hassan Phillips
*Assistant Examiner* — Prenell Jones
(74) *Attorney, Agent, or Firm* — James K. O'Hare

(57) ABSTRACT

A wireless terminal receives peer to peer resource control information from a base station. The peer to peer resource control information is used by the wireless terminal in a peer to peer network to control transmission scheduling and/or resource utilization. The base station sends the control signals at a first rate which is slower than the rate at which wireless terminals make transmission decisions for traffic slots. During the intervals between receipt of the base station control signals, wireless terminals make transmission decisions with regard to multiple traffic segments. The decisions are also influenced based on peer to peer signaling occurring between the wireless terminals in the network for each traffic slot. Resource utilization feedback information is provided from the wireless terminal to the base station. Based on the feedback information the base station updates the resource utilization control information and sends updated resource utilization control signals to the wireless terminals.

20 Claims, 8 Drawing Sheets

METHODS AND APPARATUS FOR SCHEDULING PEER TO PEER TRAFFIC IN CELLULAR NETWORKS

FIELD

Various embodiments relate to scheduling and/or resource allocation relating to peer to peer traffic, e.g., in a system in which devices support wide area network communications, e.g., cellular communications, as well as peer to peer communications.

BACKGROUND

Some systems allow for cellular communications, e.g., Wide Area Network communications, between devices via a base station or direct peer to peer communications without the communications being routed through the base station. The cellular and peer to peer communications may use the same frequency resources. Direct peer-to-peer communication without going through base station may be established to reduce the load on a base station. While allowing devices operating in a peer to peer mode to independently determine and control resource utilization for peer to peer communications reduces the processing and management burden on a base station sharing frequency resources with the devices operating in peer to peer mode, failure for a base station to exert control of frequency and/or other resource utilization has the potential to create interference problems in a cellular system.

Some or all of the frequency resources used for peer to peer communications may correspond to frequency resources used by a base station in a cell or a neighboring cell in which a wireless terminal performing peer to peer communications is located. Thus, peer to peer communications may create interference to neighboring cells and/or to cellular communication within a cell.

In order to reduce the effect of interference on one or more base stations it would be desirable if a base station could influence or control communications resources used by particular peer to peer communications links or sets of peer to peer communications links and/or the rate or frequency of resource utilization without placing an excessive management or processing burden on a base station.

SUMMARY

In accordance with various aspects, a base station transmits peer to peer control information signals to wireless terminals, e.g., mobile nodes supporting peer to peer communications, which receive and use the information. Exemplary peer to peer control information includes, e.g., one or more control parameters, which are used by the wireless terminals in a peer to peer network to control transmission scheduling and/or resource utilization. The base station sends the control signals at a first rate which is slower than the rate at which wireless terminals make transmission decisions for traffic slots. Control signals may be, and in some embodiments are, unicast to individual wireless terminals. Thus the control signals can be used to control wireless terminals on an individual basis. In some embodiments, base station control signals are sent less frequently than the peer to peer traffic transmission time slots. For example, in some embodiments, there are multiple peer to peer traffic transmission time slots between base station control information time slots.

During the intervals between receipt of the base station control signals, wireless terminals make transmission decisions with regard to multiple traffic segments, e.g., based on signals received from other wireless terminals performing peer to peer communications. When an individual wireless terminal makes a decision as to whether or not to transmit in an individual transmission traffic slot, the individual wireless terminal bases the decision on the peer to peer control information corresponding to the particular wireless terminal received from the base station and one or more signals from other wireless terminals. Resource utilization feedback information is provided from the wireless terminals to the base station. Based on the feedback information the base station updates the resource utilization control information and sends updated resource utilization control signals to the wireless terminals.

In this manner, the base station can influence resource utilization by one or more individual wireless terminals with regard to peer to peer communications without having to be involved with peer to peer transmission scheduling on a per peer transmission opportunity, e.g., peer to peer traffic slot, basis. It should be appreciated that the above described approach to a base station influencing peer to peer traffic scheduling allows the base station to have an influence and some control of interference caused by peer to peer transmissions without having to be involved with individual scheduling and/or transmission decisions which are made by the individual wireless terminals participating in peer to peer communications.

Thus, the base station influences peer to peer transmissions and resource utilization at a first rate which is lower than the rate at which individual peer to peer devices make and update one or more parameters used to control the outcome of transmission decisions made with regard to individual peer to peer traffic transmission time slots in which a device operating in peer to peer communications may transmit or refrain from transmitting.

An exemplary method of operating a wireless communications device, in accordance with some embodiments, comprises: receiving control signals from a base station at a first rate, said control signals providing peer to peer communications resource control information to said wireless communications device; and making peer to peer traffic transmission decisions based on peer to peer communications resource control information included in a control signal received from said base station and peer to peer traffic scheduling information at a second rate which is faster than said first rate. An exemplary wireless communications device, in accordance with some embodiments, comprises: at least one processor configured to: receive control signals from a base station at a first rate, said control signals providing peer to peer communications resource control information to said wireless communications device; and make peer to peer traffic transmission decisions based on peer to peer communications resource control information included in a control signal received from said base station and peer to peer traffic scheduling information at a second rate which is faster than said first rate. The exemplary communications device further comprises memory coupled to said at least one processor.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

Figure 1:
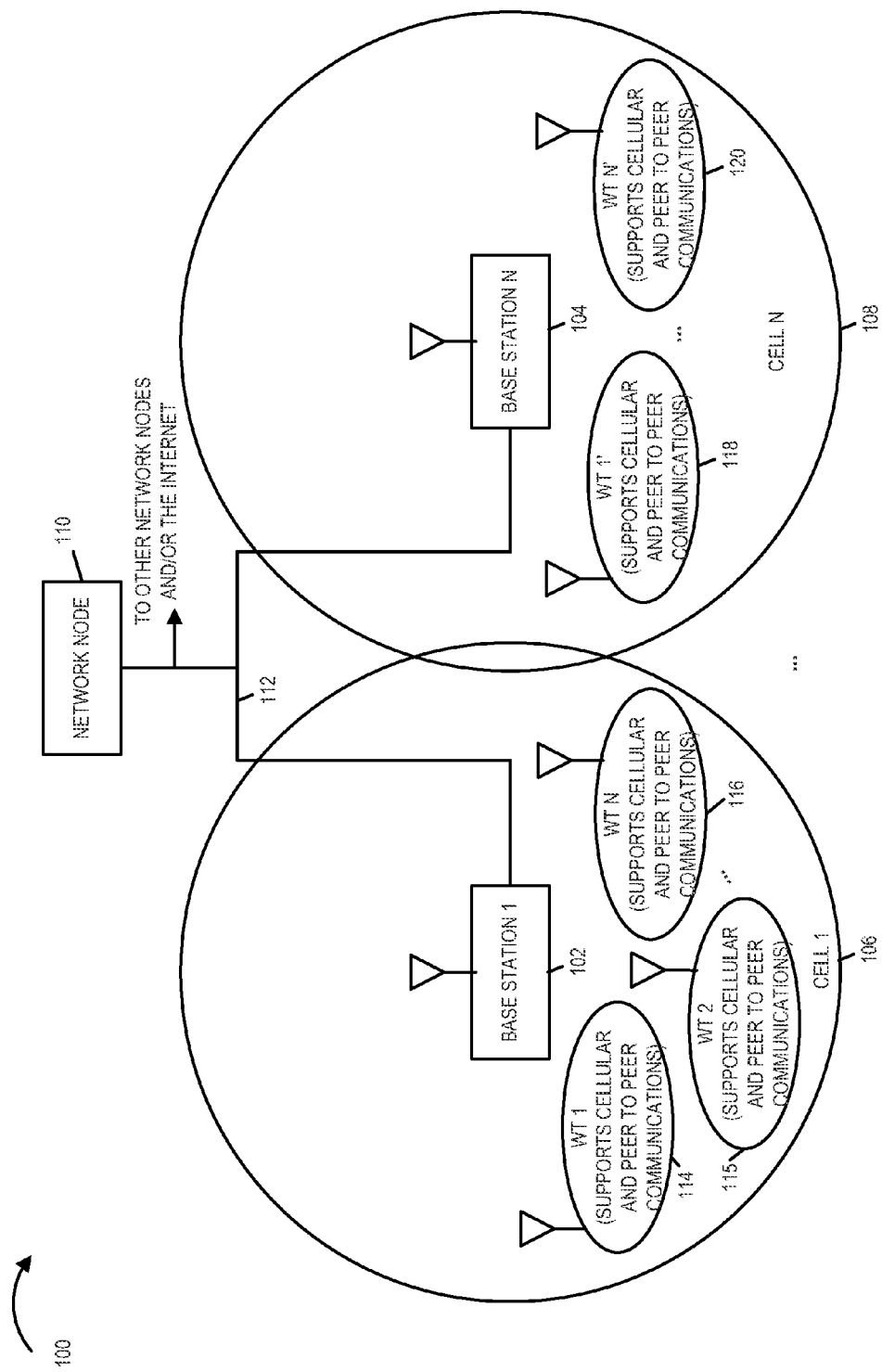
FIG. 1 is a drawing of an exemplary communications system in accordance with an exemplary embodiment.

FIG. 1 is a drawing of an exemplary communications system 100 in accordance with an exemplary embodiment. Exemplary communications system 100 supports both cellular communications and direct peer to peer communications. Communications system 100 includes a plurality of base stations (base station 1 102, . . . , base station N 104), each with a corresponding cellular coverage area (cell 1 106, . . . , cell N 108). The base stations (102, . . . , 104) are coupled together and to other network nodes including network node 110 and/or to the Internet via backhaul network 112. Exemplary communications system 100 also includes a plurality of wireless terminals, e.g., mobile nodes, which may move throughout the system and communicate with the base stations and other wireless terminals. As shown in FIG. 1, wireless terminals (wireless terminal 1 114, wireless terminal 2 115, . . . , wireless terminal N 116) are located within cell 1 106, and wireless terminals (wireless terminal 1' 118, . . . , wireless terminal N' 120) are located within cell N 108. At a different time, different wireless terminals may be situated within the cells (106, . . . , 108). In this example, each of the wireless terminals (WT 1 114, WT 2 115, . . . , WT N 116, WT 1' 118, . . . , WT N' 120) support both cellular and direct peer to peer communications. In some embodiments at least some of the wireless terminals support cellular based communications and at least some of the wireless terminals support direct peer to peer communications.

In accordance with a feature of some embodiments, peer to peer communications, e.g., within a localized peer to peer network, are influenced by both information received from a base station and information based on direct peer to peer network signaling. In some embodiments, wireless terminals make peer to peer traffic transmission decisions based on both peer to peer resource control information included in a control signal received from a base station and peer to peer traffic scheduling information. In some such embodiments, a base station exerts a coarse level of peer to peer traffic scheduling control over a peer to peer network at a first rate, while the wireless terminals of the peer to peer network exert a finer level of peer to peer traffic scheduling control over the peer to peer network at a second rate, and the second rate is faster than the first rate. For example, the base station may occasionally, e.g., at a first rate, send peer to peer resource control information signals to wireless terminals, e.g., identifying time and/or frequency resources which may be used by the wireless terminals for peer to peer communications, setting priority levels for the wireless terminals, and/or setting peer to peer transmission power control information for the wireless terminals. The wireless terminals operating in the peer to peer network, in some embodiments, make traffic transmission scheduling decisions for individual peer to peer traffic segments among themselves, e.g., in a distributed manner. In various embodiments, there are multiple opportunities for a wireless terminal to make peer to peer traffic scheduling decisions between control information updates from a base station.

Figure 2:
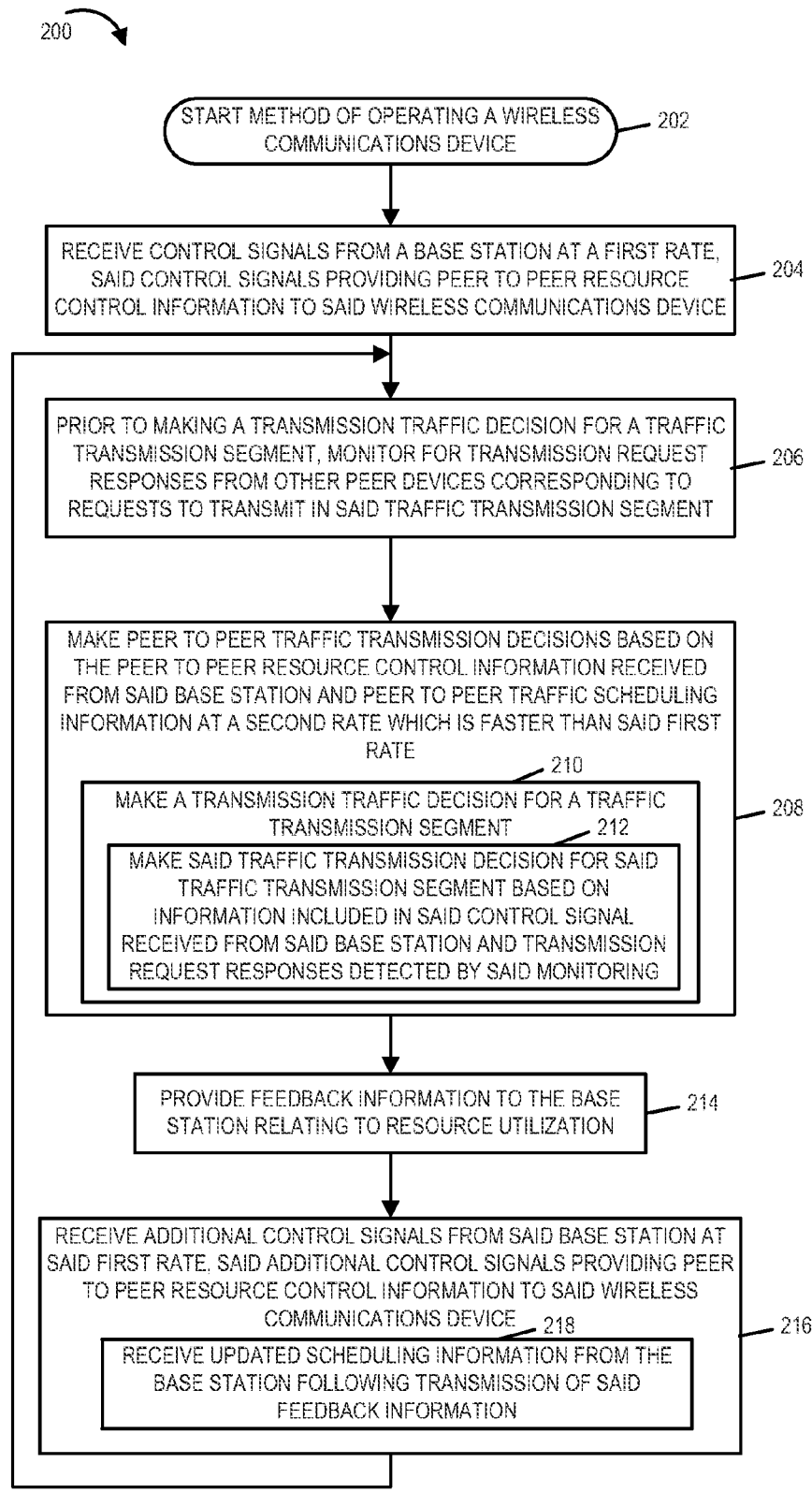
FIG. 2 is a flowchart of an exemplary method of operating a wireless communications device in accordance with various embodiments.

FIG. 2 is a flowchart 200 of an exemplary method of operating a wireless communications device which supports peer to peer communications in accordance with an exemplary embodiment. The wireless communications device implementing the method of flowchart 200 of FIG. 2 is, e.g., one of the wireless terminals (114, 115, . . . , 116, 118, . . . , 120) of system 100 of FIG. 1. Operation of the exemplary method starts in step 202, where the wireless communications device is powered on and initialized. Operation proceeds from start step 202 to step 204.

In step 204, the wireless communications device receives control signals from a base station at a first rate, said control signals providing peer to peer resource control information to said wireless communications device. In some embodiments, the control signals providing peer to peer resource control information to said wireless communications device are unicast signals. In some embodiments, at lest some of the control signals providing peer to peer resource control information to said wireless communications device are unicast signals. In some embodiments, the first rate is a first periodic rate. In some embodiments, the control information included in said control signal received from the base station includes information indicating time and/or frequency resources, e.g., time slots and/or frequencies, which may be used for peer to peer communications. In various embodiments, the control information included in said control signal received from the base station includes scheduling priority information used to control peer to peer transmission priority. For example, a communicated priority level value influences the total time you can use resources for peer to peer communications. For example, a device with priority level 1 may be allowed to use at most 20% of the resources while a device with priority 2 may be allowed to use at most 10% of the resources. In some embodiments, the received peer to peer priority information identifies sets of traffic transmission request resources which the wireless communications device is permitted to use. In some embodiments, a device with higher priority gets more request resources than a device with lower priority. In some embodiments, the request resources for requesting peer to peer traffic transmissions for a peer to peer traffic segment have a priority ordering, and a device with higher priority gets at least some request resources which have higher priority than a device with lower priority gets. In some embodiments, the control information received from the base station includes information indicating time and/or frequency resources which may be used for peer to peer communications and scheduling priority information used to control peer to peer transmission priority. In some embodiments, a device may be, and sometimes is, denied peer to peer resources, e.g., the device is not allocated any peer to peer time and/or frequency resource for peer to peer signaling. In some embodiments, the total amount of time and/or frequency resources allocated to peer to peer communications changes over time, e.g., as a function of base station cellular loading and/or interference to the cellular communications. In various embodiments, the communications resource control information includes transmission power control information, e.g., information indicating a maximum average transmission power that the wireless communications device may use during a peer to peer traffic segment. Operation proceeds from step 204 to step 206.

In step 206, the wireless communications device monitors for transmission request responses from other peer devices corresponding to requests to transmit in a traffic transmission segment, prior to making a transmission traffic decision for the traffic transmission segment. Operation proceeds from step 206 to step 208.

In step 208 the wireless communications device makes peer to peer traffic transmission decisions based on the peer to peer resource control information received from said base station and peer to peer traffic scheduling information at a second rate which is faster than said first rate. In some embodiments, the second rate is a second periodic rate.

In some embodiments, the peer to peer traffic transmission decisions are also made based on peer to peer transmission control information generated from signals received from peer devices at a rate which is faster than said first rate. The rates need not be periodic rates, and in some embodiments, the rates are not periodic rates. In some such embodiments, the rates can be average rates. For instance, in a given time period there are more peer to peer signals/slots than there are base station signal/slots which influence scheduling.

Step 208 includes step 210. In step 210 the wireless communications device makes a transmission traffic decision for a traffic transmission segment. Step 210 includes step 212, in which the wireless communications device makes said traffic transmission decision for said traffic transmission segment based on the information included in said control signal received from said base station and transmission request responses detected by said monitoring. Operation proceeds from step 208 to step 214.

In step 214 the wireless communications device provides feedback information to the base station relating to resource utilization. In some embodiments, the feedback information includes traffic utilization statistics. In some such embodiments, the feedback information includes type of traffic to be transmitted, transmission delay information, jitter, achieved data throughput, information indicating data in a transmission queue and denied transmission requests. Operation proceeds from step 214 to step 216.

In step 216 the wireless communications device receives additional control signals from said base station at said first rate, said additional control signal providing peer to peer resource control information to said wireless communications device. Step 216 includes step 218 in which the wireless communications device receives updated scheduling information from the base station following transmission of said feedback information. Operation proceeds from step 216 to step 206.

Figure 3:
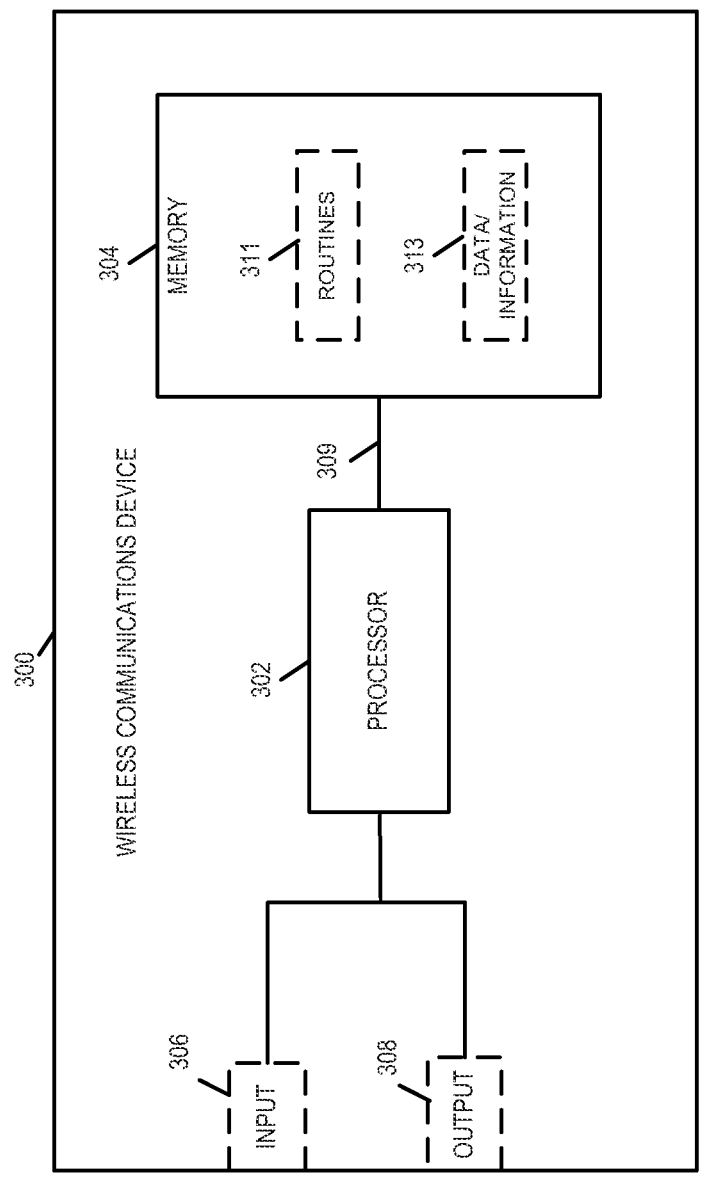
FIG. 3 is a drawing of an exemplary wireless communications device in accordance with an exemplary embodiment.

FIG. 3 is a drawing of an exemplary wireless communications device 300 in accordance with an exemplary embodiment. Exemplary wireless communications device 300 is, e.g., one of the mobile devices (114, 115, . . . , 116, 118, . . . , 120) of system 100 of FIG. 1. Exemplary wireless communications device 300 may, and sometimes does, implement a method in accordance with flowchart 200 of FIG. 2.

Wireless communications device 300 includes a processor 302 and memory 304 coupled together via a bus 309 over which the various elements (302, 304) may interchange data and information. Wireless communications device 300 further includes an input module 306 and an output module 308 which may be coupled to processor 302 as shown. However, in some embodiments, the input module 306 and output module 308 are located internal to the processor 302. Input module 306 can receive input signals. Input module 306 can, and in some embodiments does, include a wireless receiver and/or a wired or optical input interface for receiving input. Output module 308 may include, and in some embodiments does include, a wireless transmitter and/or a wired or optical output interface for transmitting output. In some embodiments, memory 304 includes routines 311 and data/information 313.

In some embodiments, processor 302 is configured to: receive control signals from a base station at a first rate, said control signals providing peer to peer communications resource control information to said wireless communications device; and make peer to peer traffic transmission decisions based on peer to peer communications resource control information included in a control signal received from said base station and peer to peer traffic scheduling information at a second rate which is faster than said first rate. In some such embodiments, processor 302 is further configured to make the peer to peer traffic transmission decisions based on peer to peer transmission control information generated from signals received from peer devices at a rate which is faster than said first rate. In some embodiments, the rates are periodic rates. In other embodiments, one or more of the rates are not periodic, e.g. the rates are average rates. For example, in a given time period there are more peer to peer signals/slots than there are signals/slots from the base station influencing scheduling. In various embodiments, said control information included in said control signal received from the base station includes information indicating time and/or frequency resources, e.g., indicating time slots and/or frequencies, which may be used for peer to peer communications. In some embodiments, said control information included in said control signal received from the base station includes scheduling priority information used to control peer to peer transmission priority. For example a priority level value communicated from the base station to the wireless communications device influences the total amount of time the wireless communications device can use peer to peer traffic resources. For example, if a wireless communication device receives a first priority level value the wireless communications device can use at most 20% of the total peer to peer traffic resources, while if the wireless communications device receives a second priority level value, the wireless communications device can use at most 10% of the total peer to peer traffic resources. In some embodiments, the control information included in said control signal received from the base station includes: information indicating time and/or frequency resources, e.g., information indicating frequencies and/or time slots, which may be used for peer to peer communications, and scheduling priority information used to control peer to peer transmission priority. In some embodiments, the communications resource control information includes transmission power control information.

In various embodiments, processor 302 is configured to make a traffic transmission decision for a traffic transmission segment, as part of being configured to making peer to peer traffic transmission decisions, and processor 302 is further configured to monitor for transmission request responses from other peer devices corresponding to requests to transmit in said traffic transmission segment, prior to making a traffic transmission decision for the traffic transmission segment. In some such embodiments, processor 302 is configured to make said traffic transmission decision for said traffic transmission segment based on information included in said control signal received from said base station and transmission request responses detected by said monitoring.

Processor 302, in various embodiments, is further configured to: provide feedback information to the base station relating to resource utilization. In some embodiments, the feedback information includes traffic utilization statistics. In some embodiments, the feedback information includes information identifying the type of traffic to be transmitted, transmission delay information, jitter, achieved data throughput, information indicating data in a transmission queue, and denied transmission requests.

Processor 302, in some embodiments, is further configured to: receive updated scheduling information from the base station following transmission of said feedback information.

Figure 4:
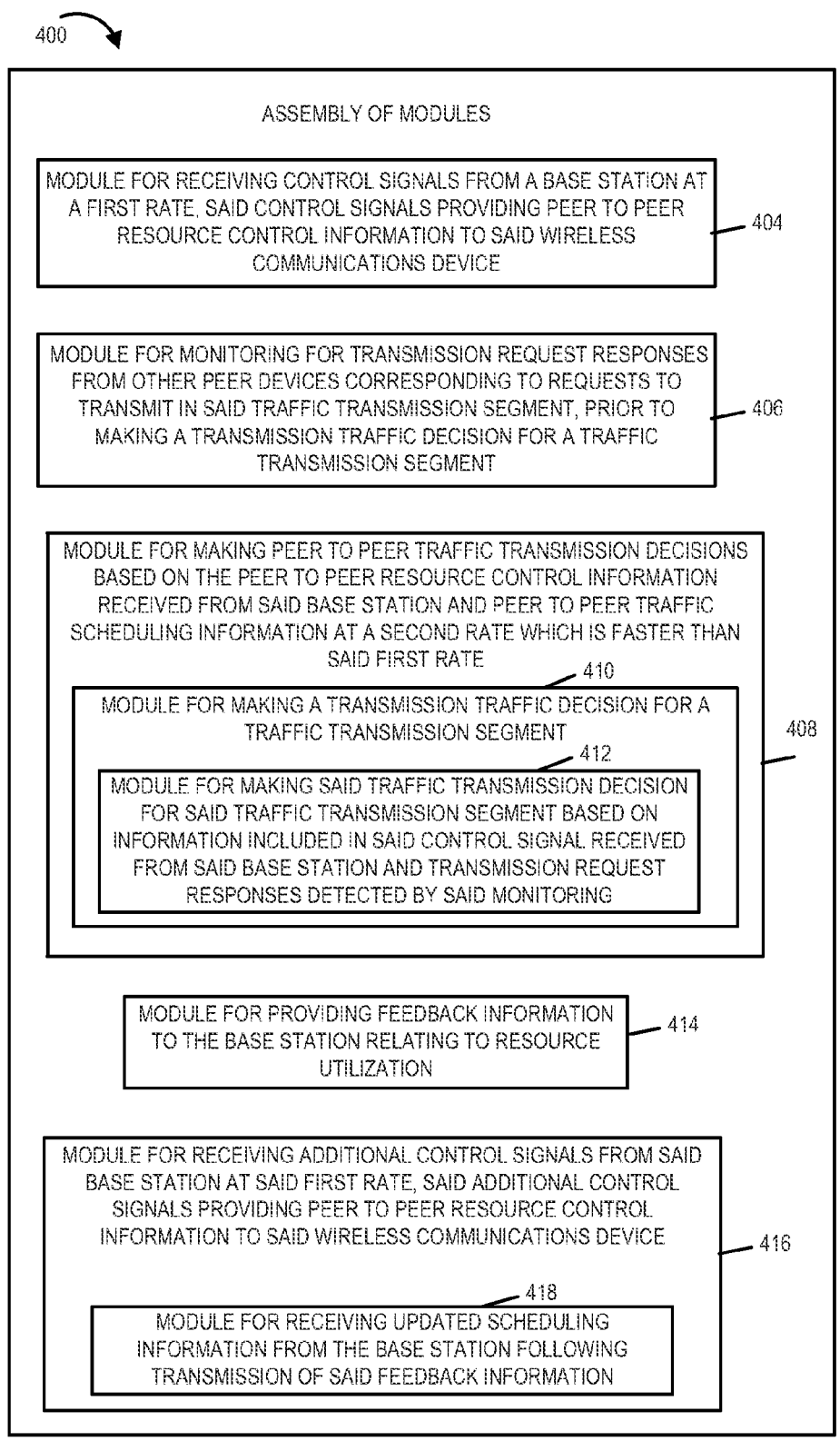
FIG. 4 is an assembly of modules which can, and in some embodiments is, used in the exemplary wireless communications device illustrated in FIG. 3.

FIG. 4 is an assembly of modules 400 which can, and in some embodiments is, used in the exemplary wireless communications device 300 illustrated in FIG. 3. The modules in the assembly 400 can be implemented in hardware within the processor 302 of FIG. 3, e.g., as individual circuits. Alternatively, the modules may be implemented in software and stored in the memory 304 of wireless communications device 300 shown in FIG. 3. In some such embodiments, the assembly of modules 400 is included in routines 311 of memory 304 of device 300 of FIG. 3. While shown in the FIG. 3 embodiment as a single processor, e.g., computer, it should be appreciated that the processor 302 may be implemented as one or more processors, e.g., computers. When implemented in software the modules include code, which when executed by the processor, configure the processor, e.g., computer, 302 to implement the function corresponding to the module. In some embodiments, processor 302 is configured to implement each of the modules of the assembly of modules 400. In embodiments where the assembly of modules 400 is stored in the memory 304, the memory 304 is a computer program product comprising a computer readable medium, e.g., a non-transitory computer readable medium, comprising code, e.g., individual code for each module, for causing at least one computer, e.g., processor 302, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 4 control and/or configure the wireless communications device 300 or elements therein such as the processor 302, to perform the functions of the corresponding steps illustrated and/or described in the method of flowchart 200 of FIG. 2.

Assembly of modules 400 includes a module 404 for receiving control information from a base station at a first rate, said control signals providing peer to peer resource control information to said wireless communications device, a module 406 for monitoring for transmission request responses from other peer to peer devices corresponding to requests to transmit in said traffic transmission segment, prior to making a transmission traffic decision for a traffic transmission segment, a module 408 for making peer to peer traffic transmission decisions based on the peer to peer resource control information received from said base station and peer to peer traffic scheduling information at a second rate which is faster than said first rate, a module 414 for providing feedback information to the base station relating to resource utilization, and a module 416 for receiving additional control signals from said base station at said first rate, said additional control signals providing peer to peer resource control information to said wireless communications device.

Module 408 includes a module 410 for making a transmission traffic decision for a traffic transmission segment. Module 410 includes a module 412 for making said traffic transmission decision for the traffic transmission segment based on information included in said control signal received from said base station and transmission request responses detected by said monitoring. Module 416 includes a module 418 for receiving updated scheduling information from the base station following transmission of said feedback information.

Figure 5:
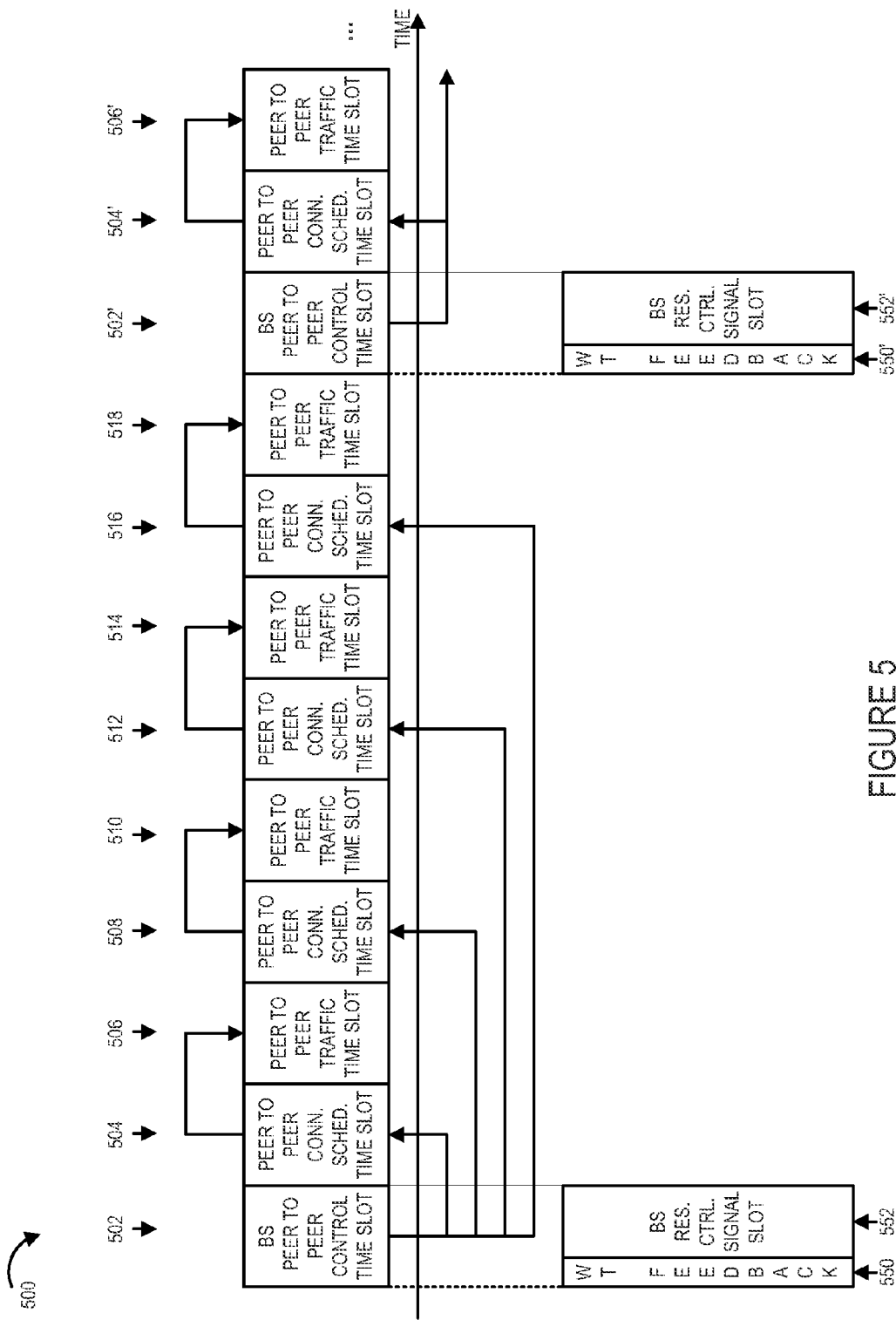
FIG. 5 is a drawing of an exemplary recurring peer to peer timing structure in accordance with an exemplary embodiment.

FIG. 5 is a drawing of an exemplary recurring peer to peer timing structure 500 in accordance with an exemplary embodiment. One iteration of the exemplary peer to peer recurring timing structure 500 includes a base station peer to peer control time slot 502, a first peer to peer connection scheduling time slot 504, a first peer to peer traffic time slot 506, a second peer to peer connection scheduling time slot 508, a second peer to peer traffic time slot 510, a third peer to peer connection scheduling time slot 512, a third peer to peer traffic time slot 514, a fourth peer to peer connection scheduling time slot 516, and a fourth peer to peer traffic time slot 518. Then the sequence repeats including base station peer to peer control time slot 502', first peer to peer control scheduling time slot 504', first peer to peer traffic time slot 506', . . . .

In base station peer to peer control time slot, wireless communications devices which support peer to peer signaling, provide feedback information to the base station relating to resource utilization. Feedback information, in some embodiments, includes one or more of all of: traffic utilization statistics, information indicating the type of traffic to be transmitted, transmission delay information, jitter information, achieved data throughput information, information indicating data in a transmission queue, and denied transmission request information. In this example, base station peer to peer control time slots (502, 502') include wireless terminal feedback sub-slots (550, 550'), respectively for communicating feedback information to the base station relating to peer to peer resource utilization.

In a base station peer to peer control time slot, a base station transmits control signals to wireless communications devices which support peer to peer signaling, said control signals providing peer to peer communications resource information to the wireless communications devices. The peer to peer communications resource information, which is communicated, may have been updated based on previously received feedback information. The peer to peer communications resource information includes one or more or all of: information indicating time and/or frequency resources which may be used for peer to peer communications, scheduling priority information used to control peer to peer transmission priority, and transmission power control information. The wireless communications devices receive the peer to peer resource information and use the information in making subsequent peer to peer traffic transmission decisions. For example, information received in base station peer to peer control time slot 502 is used by wireless communications devices in peer to peer connection scheduling time slots (504, 508, 512, 516) to make traffic transmission decisions regarding peer to peer traffic slots (506, 510, 514, 518), respectively. Continuing with the example, information received in base station peer to peer control time slot 502' is used by wireless communications devices in peer to peer connection scheduling time slots (504', 508', 512', 516') to make traffic transmission decisions regarding peer to peer traffic slots (506', 510', 514', 518'), respectively. In this example, base station peer to peer control time slots (502, 502') include wireless base station peer to peer resource control signaling time sub-slots (552, 552'), respectively for communicating base station peer to peer resource control information signals to the wireless communications devices.

Each peer to peer connection scheduling time slot (504, 508, 512, 516, 504', 508', 512', 516') has a corresponding peer to peer traffic time slot (506, 510, 514, 518, 506', 510', 514', 518'), respectively. During a peer to peer connection scheduling time slot traffic transmission scheduling is decided, e.g., in a decentralized distributed manner among the peer to peer wireless communications devices. For example, individual peer to peer wireless terminals which desire to transmit in the corresponding peer to peer traffic transmission segment and are potentially allowed to transmit in accordance with their base station received resource control information, e.g., received priority level and received time and/or frequency resource allowable usage information, transmit request signals. A wireless communications device monitors for request response signals corresponding to its own request and corresponding to other requests. Multiple links may be, and sometimes are, requesting to use the same peer to peer traffic transmission segment. A wireless communications device makes a transmission decision as a function of received request response information, e.g., estimating interference to other communications links if it should transmit and using its estimation in making its transmission decision.

Figure 6:
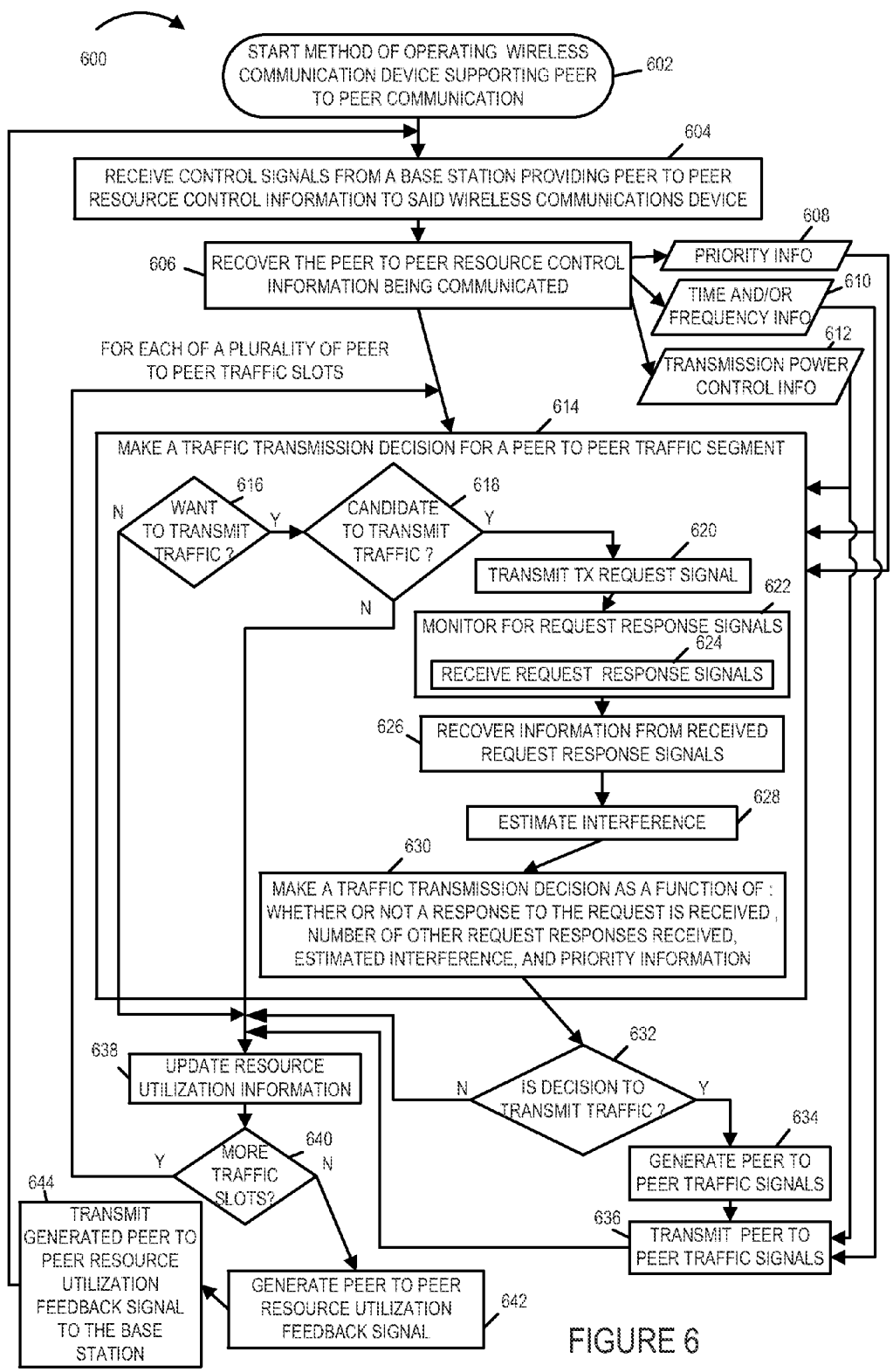
FIG. 6 is a flowchart of an exemplary method of operating a wireless communications device supporting peer to peer communications in accordance with an exemplary embodiment.

FIG. 6 is a flowchart 600 of an exemplary method of operating a wireless communications device supporting peer to peer communications in accordance with an exemplary embodiment. The wireless communications device is, e.g., one of the wireless terminals (114, ..., 116, 118, ..., 120) of system 100 of FIG. 1. Operation of the exemplary method starts in step 602, where the wireless communications device is powered on and initialized. Operation proceeds from start step 602 to step 604.

In step 604 the wireless communications device receives control signals from a base station providing peer to peer resource control information to said wireless communications device. In some embodiments, the control signals providing peer to peer resource control information to said wireless communications device are unicast signals. In some embodiments, at least some of the control signals providing peer to peer resource control information to said wireless communications device are unicast signals. Operation proceeds from step 604 to step 606. In step 606 the wireless communications device recovers the peer to peer resource control information being communicated in the control signals received in step 604. In this example, the wireless communications device recovers priority information 608, e.g., a priority level for using peer to peer traffic resources, time and/or frequency information 610, e.g., information identifying time slots and/or frequencies allowed to be used for peer to peer communications, and transmission power control information 612, e.g., information identifying the maximum or average maximum power the wireless communications device is allowed to use for transmission in a peer to peer traffic segment.

Operation proceeds from step 606 to step 614, which is performed for each of a plurality of peer to peer traffic slots, e.g., for a predetermined number of consecutive peer to peer traffic slots in accordance with a peer to peer timing structure. In step 614 the wireless communications device makes a traffic transmission decision for a peer to peer traffic segment. Step 614 uses the recovered peer to peer control information (608, 610, and/or 612) from the base station in making the traffic transmission decision of step 614. Step 614 includes steps 616, 618, 620, 622, 624, 626, 628 and 630. In step 616 the wireless communications device determines if it wants to transmit peer to peer traffic signals in the peer to peer traffic segment, e.g., the wireless communications device determines whether it has peer to peer traffic data waiting in a queue to transmit at the current time. If the wireless communications device determines that it wants to transmit traffic, then operation proceeds from step 616 to step 618; otherwise, the wireless communications device has determined that it will not transmit traffic during the peer to peer traffic segment under consideration and operation proceeds from step 616 to step 638.

Returning to step 618, in step 618 the wireless communications device determines if it is a candidate to transmit peer to peer traffic signals in the peer to peer traffic segment under consideration. For example, based on a low level of priority the wireless communications device may not be allowed to transmit traffic in this peer to peer traffic segment or based on the time and/or frequency information received from the base station, the wireless communications device may not be allowed to transmit traffic in this peer to peer traffic segment. If the wireless communications device determines that it is a candidate to transmit traffic, then operation proceeds from step 618 to step 620; otherwise the wireless communications device decides that it will not transmit traffic during the peer to peer traffic segment under consideration and operation proceeds from step 618 to step 638.

Returning to step 620, in step 620 the wireless communications device transmits a peer to peer transmission request signal. Then in step 622 the wireless communications device monitors for request response signals. Step 622 may, and sometimes does, include step 624 in which the wireless communications device receives one or more request response signals. Received request response signals may include a response to the wireless communication device's request of step 620 and responses corresponding to other peer to peer communications links which may also desire to use the same peer to peer traffic segment. Operation proceeds from step 622 to step 626. In step 626 the wireless communications device recovers information from received request response signals. Then in step 628 the wireless communications device estimates interference, e.g., interference that the wireless communications device is expected to cause to other links and interference that the receiver of the wireless communications device's traffic signals is expected to encounter. The interference estimates are based on measurements of received transmission request signals corresponding to other links, and received request response signals corresponding to its own request and corresponding to other links Operation proceeds from step 628 to step 630.

In step 630 the wireless communications device makes a traffic transmission decision as a function of: whether or not a response to the request of step 620 was received, a number of other request responses received, estimated interference information, and priority information. For example, the wireless communications device may decide to yield and not transmit traffic signals in the peer to peer traffic segment if the estimated interference to a higher priority device or higher priority link is determined to be above a predetermined threshold. Operation proceeds from step 630 to step 632.

In step 632 if the decision of step 630 was to refrain from transmitting traffic in the peer to peer traffic segment, then operation proceeds from step 632 to step 638. However, if the decision of step 630 was to transmit traffic then, operation proceeds from step 632 to step 634. In step 634 the wireless communications device generates peer to peer traffic signals. Then in step 636 the wireless communications device transmits the generated peer to peer traffic signals in the peer to peer traffic segment. In step 636 the wireless communications device may, and sometimes does, control the transmission of the peer to peer traffic signals based on transmission power control information 612 and/or time and/or frequency resource information 610. Operation proceeds from step 636 to step 638. In step 638 the wireless communications device updates resource utilization information. Operation proceeds from step 638 to step 640. In step 640 the wireless communications device determines whether or not there are more traffic slots to process, e.g., in the timing structure before receiving additional peer to peer resource control signals from the base station. If the wireless communications device determines that there are more traffic slots to consider, then operation proceeds from step 640 to step 614 to make a traffic transmission decision for another peer to peer traffic segment. However, if the wireless communications device determines that there are not more traffic slots, then operation proceeds from step 640 to step 642.

In step 642 the wireless communications device generates a peer to peer resource utilization feedback signal. Operation proceeds from step 642 to step 644 in which the wireless communications device transmits the generated peer to peer resource utilization feedback signal to the base station. The transmitted resource utilization feedback signal includes one or more or all of: traffic utilization statistics, information identifying the type of traffic to be transmitted, transmission delay information, jitter information, achieved data throughput information, information indicating data in a transmission queue, information indicating the amount of data in a transmission queue, information indicating the number of denied transmission requests, and information indicating the number of times the wireless communications decided to yield. The base station receives the peer to peer resource utilization feedback signal from the wireless communications device and peer resource utilization signal from other wireless communications devices. The base station generates and transmits control signals providing peer to peer resource control information to the wireless communications device. Operation of the exemplary method proceeds from step 644 to step 604, in which the wireless communication device receives additional control signals from the base station providing peer to peer resource control information to the wireless communications device. In various embodiments the received additional control signals from the base station provide peer to peer resource information which may, and sometimes does, include updated scheduling information, e.g., a change in the priority level given to the wireless communications device, and/or a change in the time and/or frequency resources allowed to be used by the wireless communications device for peer to peer communications.

The rate at which the wireless communications device receives control signals from a base station providing peer to peer resource control information to the wireless communications device is less than the rate at which the wireless communications device makes transmission decisions for peer to peer traffic segment. The rate at which the wireless communications device updates resource utilization information is less than the rate at which the wireless communications device transmits a peer to peer resource utilization feedback signal to the base station.

Figure 7:
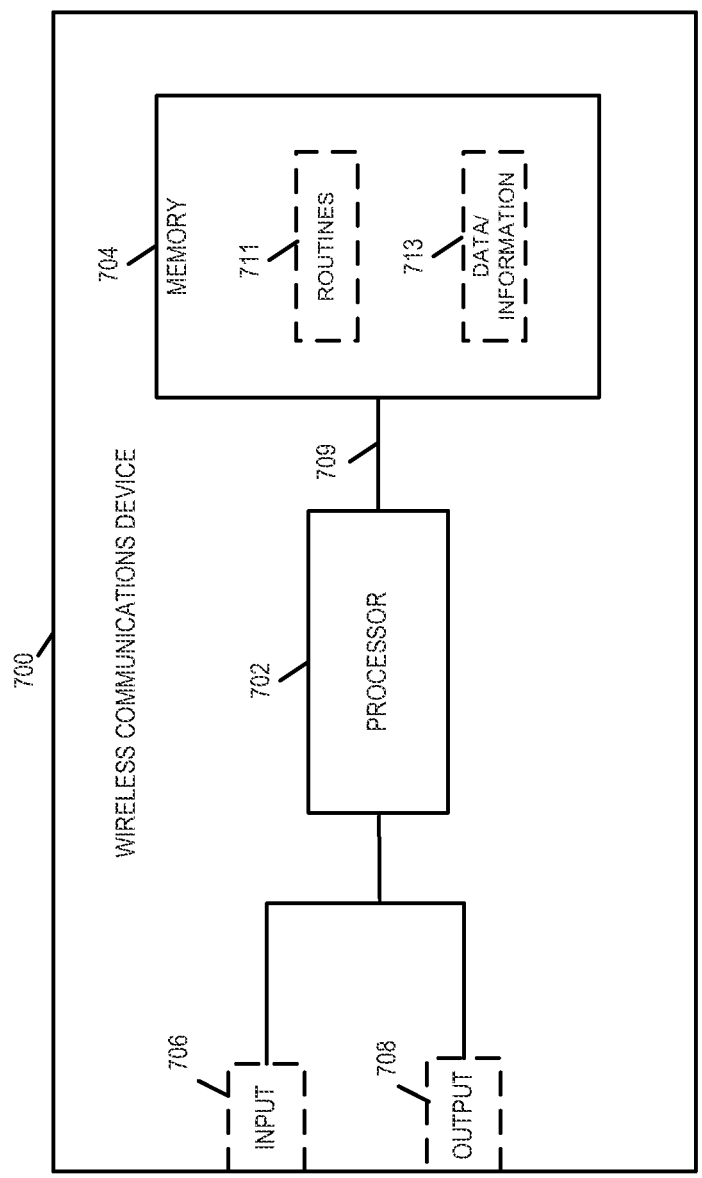
FIG. 7 is an assembly of modules which can, and in some embodiments is, used in the exemplary wireless communications device illustrated in FIG. 6.

FIG. 7 is a drawing of an exemplary wireless communications device 700 in accordance with an exemplary embodiment. Exemplary wireless communications device 700 is, e.g., one of the mobile wireless communications devices of system 100 of FIG. 1. Exemplary wireless communications device 700 may, and sometimes does, implement a method in accordance with flowchart 600 of FIG. 6.

Wireless communications device 700 includes a processor 702 and memory 704 coupled together via a bus 709 over which the various elements (702, 704) may interchange data and information. Wireless communications device 700 further includes an input module 706 and an output module 708 which may be coupled to processor 702 as shown. However, in some embodiments, the input module 706 and output module 708 are located internal to the processor 702. Input module 706 can receive input signals. Input module 706 can, and in some embodiments does, include a wireless receiver and/or a wired or optical input interface for receiving input. Output module 708 may include, and in some embodiments does include, a wireless transmitter and/or a wired or optical output interface for transmitting output. In some embodiments, memory 704 includes routines 711 and data/information 713.

Figure 8:
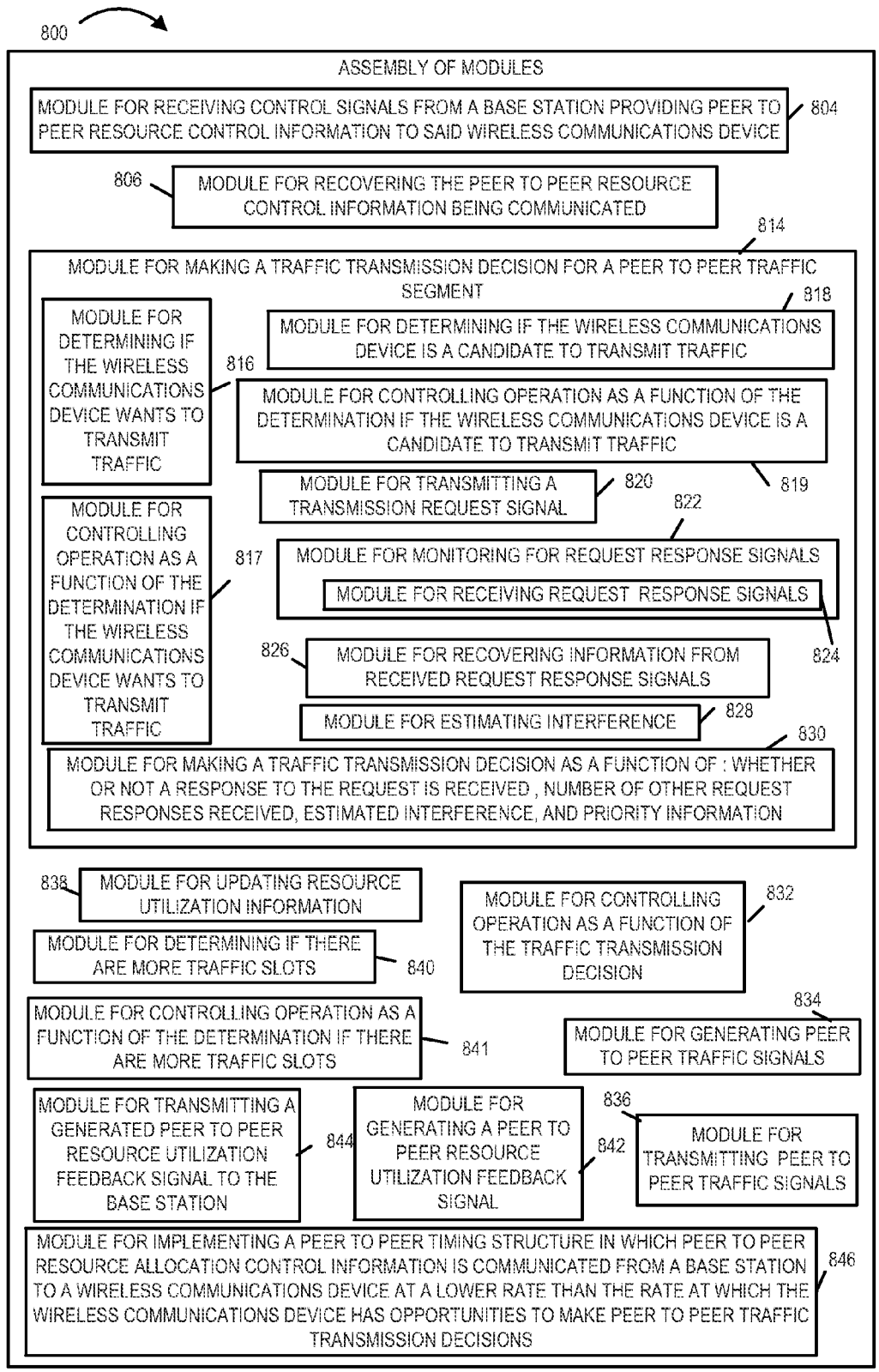
FIG. 8 is an assembly of modules which can, and in some embodiments is, used in the exemplary wireless communications device illustrated in FIG. 7.

FIG. 8 is an assembly of modules 800 which can, and in some embodiments is, used in the exemplary wireless communications device 700 illustrated in FIG. 7. The modules in the assembly 800 can be implemented in hardware within the processor 702 of FIG. 7, e.g., as individual circuits. Alternatively, the modules may be implemented in software and stored in the memory 704 of wireless communications device 700 shown in FIG. 7. In some such embodiments, the assembly of modules 800 is included in routines 711 of memory 704 of device 700 of FIG. 7. While shown in the FIG. 7 embodiment as a single processor, e.g., computer, it should be appreciated that the processor 702 may be implemented as one or more processors, e.g., computers. When implemented in software the modules include code, which when executed by the processor, configure the processor, e.g., computer, 702 to implement the function corresponding to the module. In some embodiments, processor 702 is configured to implement each of the modules of the assembly of modules 800. In embodiments where the assembly of modules 800 is stored in the memory 704, the memory 704 is a computer program product comprising a computer readable medium, e.g., a non-transitory computer readable medium, comprising code, e.g., individual code for each module, for causing at least one computer, e.g., processor 702, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 8 control and/or configure the wireless communications device 700 or elements therein such as the processor 702, to perform the functions of the corresponding steps illustrated and/or described in the method of flowchart 600 of FIG. 6.

Assembly of modules 800 includes a module 804 for receiving control signals from a base station providing peer to peer resource control information to said wireless communications device, a module 806 for recovering the peer to peer resource control information being communicated to the wireless communications device, a module 814 for making a traffic transmission decision for a peer to peer traffic segment, a module 832 for controlling operation as a function of the traffic transmission decision, a module 834 for generating peer to peer traffic signals, a module 836 for transmitting generated peer to peer traffic signals, a module 838 for updating resource utilization information, a module 840 for determining if there are more peer to peer traffic slots to process, a module 841 for controlling operation as a function of the determination of module 840 as to whether or not there are more traffic slots to process, a module 842 for generating a peer to peer resource utilization feedback signal, and a module 844 for transmitting a generated peer to peer resource utilization feedback signal to the base station and a module 846 for implementing a peer to peer timing structure in which a base station communicates peer to peer resource allocation control information to a wireless communications device at a lower rate than the rate at which the wireless communications device has opportunities to make peer to peer traffic transmission decisions. Module 814 includes a module 816 for determining if the wireless communications device wants to transmit peer to peer traffic in the current peer to peer traffic segment under consideration, a module 817 for controlling operation as a function of the determination of module 816 as to whether or not the wireless communications device wants to transmit traffic, a module 818 for determining if the wireless communications device is a candidate to transmit peer to peer traffic in the peer to peer traffic segment under consideration, a module 819 for controlling operation as a function of the determination of module 818 as to whether or not the wireless communications device is a candidate to transmit traffic, a module 820 for transmitting a transmission request signal corresponding to a peer to peer traffic segment, a module 822 for monitoring for request response signals, a module 824 for receiving request response signals, a module 826 for recovering information from received request response signals, a module for estimating interference 828, and a module 830 for making a traffic transmission decision as a function of whether or not a response to the request transmitted by module 820 is received by module 824, the number of other request responses received by module 824, estimated interference by module 828, and priority information.

Various aspects and/or features of some, but not necessarily all, embodiments will be discussed below. It should be appreciated that in some wireless communications systems including base stations, e.g., some communications systems supporting cellular wireless communications, peer to peer communications may also be supported including multiple direct peer-to-peer links. It is desirable that links in the vicinity of each other should be orthogonalized in terms of frequency resources being used. Meanwhile, links which are far away from each other can reuse time/frequency resources. The base station through one or more control parameters sent to wireless terminals, e.g., at the first rate, can influence which frequency resources a particular wireless terminal uses for a communications link corresponding to the wireless terminal and/or the rate, e.g., how often the resources are used during a given time period, at which such resources are used. Thus, the methods and apparatus used in various embodiments allow a base station to influence allocation time/frequency resources for peer to peer communications, including scheduling of peer-to-peer communications between mobiles which use at least some communications resources which are also used by a wide area network (WWAN), e.g., cellular network.

Various features are directed to a hierarchical scheduling decision making process which involves both the base stations and the wireless communications devices, e.g., mobiles. In some embodiment the scheduling decision includes one or more of the following: (i) deciding which resources are assigned for peer to peer communications; and (ii) deciding which links are able to use a particular time-frequency resources. It can be beneficial if both a base station and mobiles are involved in this decision process. It is sometimes beneficial if the decision as to which resources are assigned for peer to peer communications is made in a centralized manner since it can potentially affects the other conventional wide area network (WAN) communications. Also for peer to peer communications across different cells, it may be beneficial for some collaboration to happen across neighboring base stations. On the other hand, for deciding which links are able to use particular time-frequency resources, it might be too expensive or costly, e.g., in terms of using the valuable limited air link resources, for base stations to make the decisions since a lot of local information might need to be fed back to the base stations from the mobiles. Thus, it can be beneficial for at least a certain level of decision making for deciding which links are to use which particular time-frequency resources to happen in a distributed manner. Hence, in such systems where peer to peer communications are enabled to a cellular network, it can be beneficial to have a two level decision making process in terms of scheduling, one happens at base station level and the other happens at mobile level, which is distributed.

There are multiple possibilities in terms of amount of decisions made at each level. A first approach is a base station centric scheduling approach. In this scheme, base station makes all or most of the decisions. The base station decides which peer-to-peer link should be scheduled on which time/frequency resource. The traffic scheduling of the base station can be based on the information of direct link channel quality and crossing link interference. This direct link and cross link information may be fed back from the mobiles. Additionally, if the mobiles are equipped with GPS, they can feed back the location information to the base station, and the base station can calculate the direct link channel quality and crossing link interference from the location information and realistic channel models.

In a second approach a base station assigns periodic frequency-time resources for peer to peer communications. Mobiles determine which link or links get to transmit, e.g., based on a distributed protocol. In one exemplary peer to peer signaling protocol a decentalized approach to scheduling traffic in peer to peer traffic segment is used in which individual mobile make yielding decisions regarding scheduling for peer to peer traffic segments, e.g., based on estimated interference and/or priority information.

In a third approach joint scheduling is employed. The base station and the mobiles jointly determine which links to transmit in a given peer to peer communication resource. In this scheme, the traffic scheduling happens in two different time scales. In the fast time scale, mobiles participating in the direct peer-to-peer communications perform a distributed connection protocol. After a certain number of rounds of fast scheduling, the mobiles feed back a cumulative traffic statistics to the base station. Based on the feedback statistics, the base station performs a slow scale control on the connection scheduling. For example, the base station can set priorities of peer-to-peer links before the mobiles take part in the next round of fast scale connection scheduling blocks.

In various embodiments a device, e.g., wireless communications device 300 of FIG. 3 of wireless communications device 700 of FIG. 7, includes a module corresponding to each of the individual steps and/or operations described with regard to any of the Figures in the present application and/or described in the detailed description of the present application. The modules may, and sometimes are implemented in hardware. In other embodiments, the modules may, and sometimes are, implemented as software modules including processor executable instructions which when executed by the processor of the communications device cause the device to implement the corresponding step or operation. In still other embodiments, some or all of the modules are implemented as a combination of hardware and software.

The techniques of various embodiments may be implemented using software, hardware and/or a combination of software and hardware. Various embodiments are directed to apparatus, e.g., network nodes such as location determination server nodes, mobile nodes such as mobile terminals, access points such as base stations serving as location anchor points, and/or communications systems. Various embodiments are also directed to methods, e.g., method of controlling and/or operating network nodes, mobile nodes, access points such as base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, signal processing, signal generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., communications node, including a processor configured to implement one, multiple or all of the steps of one or more methods of the invention.

In some embodiments, the processor or processors, e.g., CPUs, of one or more devices, e.g., communications nodes such as network nodes, access nodes and/or wireless terminals, are configured to perform the steps of the methods described as being performed by the communications nodes. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications node, with a processor which includes a module corresponding to each of the steps of the various described methods performed by the device in which the processor is included. In some but not all embodiments a device, e.g., communications node, includes a module corresponding to each of the steps of the various described methods performed by the device in which the processor is included. The modules may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

Various embodiments are well suited to communications systems using a peer to peer signaling protocol. Various embodiments are well suited to location determination in indoor environments.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between communications devices. In some embodiments one or more communications devices are implemented as access points which establish communications links with mobile nodes using OFDM and/or CDMA and/or may provide connectivity to the internet or another network via a wired or wireless communications link. In various embodiments the mobile nodes are implemented as notebook computers, personal data assistants (PDAs), or other portable devices including receiver/transmitter circuits and logic and/or routines, for implementing the methods.

Various methods and/or apparatus are described wherein a base station in a cell including wireless terminals supporting peer to peer communications is able to influence resource utilization by peer to peer devices without having to control the scheduling of peer to peer transmissions during individual traffic time slots.

What is claimed is:

1. A method of operating a wireless communications which supports peer to peer communications, the method comprising:
receiving control signals from a base station at a first rate, said control signals providing peer to peer communications resource control information to said wireless communications device, said control information including scheduling priority information indicating a peer to peer transmission priority to be used by said wireless communications device when making a traffic transmission decision; and
making peer to peer traffic transmission decisions, at a second rate which is faster than said first rate, based on peer to peer communications resource control information including said peer to peer transmission priority included in a control signal received from said base station and based on peer to peer traffic scheduling information, multiple peer to peer traffic transmission decisions being made based on said peer to peer transmission priority during a period of time prior to receiving another control signal from said base station indicating a new peer to peer transmission priority to be used by said wireless communications device.

2. The method of claim 1, wherein said scheduling priority information indicates a maximum portion of peer to peer transmission resources that said wireless communications device can use.

3. The method of claim 1, further comprising:
providing feedback information including traffic utilization statistics to the base station.

4. The method of claim 2, wherein said maximum portion is indicated as a percentage of total peer to peer transmission resources said wireless communications device is allowed to use.

5. The method of claim 1, wherein said control information included in said control signal received from the base station includes:
information indicating time resources, frequency resources, or time and frequency resources which may be used for peer to peer communications.

6. The method of claim 1, wherein making peer to peer traffic transmission decisions includes making a traffic transmission decision for a traffic transmission segment, the method further comprising:
prior to making a traffic transmission decision for the traffic transmission segment,
monitoring for transmission request responses from other peer devices corresponding to requests to transmit in said traffic transmission segment; and
wherein making a traffic transmission decision for the traffic transmission segment includes making said traffic transmission decision for said traffic transmission segment based on information included in said control signal received from said base station and transmission request responses detected by said monitoring.

7. The method of claim 3, further comprising:
providing, as part of said feedback information, information indicating a number of times the wireless communications device decided to yield and not transmit traffic signals in a peer to peer traffic segment based on at least one of an estimated interference or priority information.

8. A wireless communications device comprising:
means for receiving control signals from a base station at a first rate, said control signals providing peer to peer communications resource control information to said wireless communications device, said control information including scheduling priority information indicating a peer to peer transmission priority to be used by said wireless communications device when making a traffic transmission decision; and
means for making peer to peer traffic transmission decisions, at a second rate which is faster than said first rate, based on peer to peer communications resource control information including said peer to peer transmission priority included in a control signal received from said base station and based on peer to peer traffic scheduling information, multiple peer to peer traffic transmission decisions being made based on said peer to peer transmission priority during a period of time prior to receiving another control signal from said base station indicating a new peer to peer transmission priority to be used by said wireless communications device.

9. The wireless communications device of claim 8, wherein said means for making peer to peer traffic transmission decisions bases its decisions on peer to peer transmission control information generated from signals received from peer devices at a rate which is faster than said first rate.

10. The wireless communications device of claim 8, wherein said control information included in said control signal received from the base station includes information indicating time resources, frequency resources, or time and frequency resources which may be used for peer to peer communications.

11. The wireless communications device of claim 8, wherein said scheduling priority information indicates a maximum portion of peer to peer transmission resources that said wireless communications device can use.

12. The wireless communications device of claim 11, wherein said maximum portion is indicated as a percentage of total peer to peer transmission resources said wireless communications device is allowed to use.

13. The wireless communications device of claim 8, wherein said means for making peer to peer traffic transmission decisions includes means for making a traffic transmission decision for a traffic transmission segment, said wireless communications device further comprising:
means for monitoring for transmission request responses from other peer devices corresponding to requests to transmit in said traffic transmission segment, prior to making a traffic transmission decision for the traffic transmission segment; and
wherein said means for making a traffic transmission decision for the traffic transmission segment includes means for making said traffic transmission decision for said traffic transmission segment based on information included in said control signal received from said base station and transmission request responses detected by said monitoring.

14. The wireless communications device of claim 8, further comprising:
means for providing feedback information including traffic utilization statistics to the base station.

15. A computer program product for use in a wireless communications device, the computer program product comprising:
a non-transitory computer readable medium comprising:
code for causing at least one computer to receive control signals from a base station at a first rate, said control signals providing peer to peer communications resource control information to said wireless communications device, said control information including scheduling priority information indicating a peer to peer transmission priority to be used by said wireless communications device when making a traffic transmission decision; and
code for causing said at least one computer to make peer to peer traffic transmission decisions at a second rate which is faster than said first rate, based on peer to peer communications resource control information including said peer to peer transmission priority included in a control signal received from said base station and based on peer to peer traffic scheduling information, multiple peer to peer traffic transmission decisions being made based on said peer to peer transmission priority during a period of time prior to receiving another control signal from said base station indicating a new peer to peer transmission priority to be used by said wireless communications device.

16. A wireless communications device comprising:
at least one processor configured to:
  receive control signals from a base station at a first rate, said control signals providing peer to peer communications resource control information to said wireless communications device, said control information including scheduling priority information indicating a peer to peer transmission priority to be used by said wireless communications device when making a traffic transmission decision; and
  make peer to peer traffic transmission decisions, at a second rate which is faster than said first rate, based on peer to peer communications resource control information including said peer to peer transmission priority included in a control signal received from said base station and based on peer to peer traffic scheduling information, multiple peer to peer traffic transmission decisions being made based on said peer to peer transmission priority during a period of time prior to receiving another control signal from said base station indicating a new peer to peer transmission priority to be used by said wireless communications device; and
  memory coupled to said at least one processor.

17. The wireless communications device of claim 16, wherein said at least one processor is further configured to provide feedback information including traffic utilization statistics to the base station.

18. The wireless communication device of claim 16, wherein said control information included in said control signal received from the base station includes information indicating time resources, frequency resources, or time and frequency resources which may be used for peer to peer communications.

19. The wireless communications device of claim 17, wherein said scheduling priority information indicates a maximum portion of peer to peer transmission resources that said wireless communications device can use.

20. The wireless communications device of claim 19, wherein said maximum portion is indicated as a percentage of total peer to peer transmission resources said wireless communications device is allowed to use.

* * * * *